United States Patent [19]

Kline

[11] 3,975,360

[45] Aug. 17, 1976

[54] AGE RESISTERS FOR OXIDIZABLE POLYMERS

[75] Inventor: Richard H. Kline, Cuyahoga Falls, Ohio

[73] Assignee: The Goodyear Tire & Rubber Company, Akron, Ohio

[22] Filed: Dec. 20, 1974

[21] Appl. No.: 534,609

[52] U.S. Cl. .................. 260/45.85 R; 260/45.95 H; 260/45.95 L; 260/488 CD; 260/619 A; 260/619 B; 260/624 R

[51] Int. Cl.² ...................... C08J 3/20; C07C 69/76

[58] Field of Search ..... 260/488 CD, 488 R, 624 R, 260/619 A, 619 B, 45.85 R, 45.95 H, 45.95 R, 31.6

[56] References Cited

UNITED STATES PATENTS

| | | | |
|---|---|---|---|
| 3,116,305 | 12/1963 | Morris et al. | 260/45.85 T |
| 3,590,085 | 6/1971 | Braus et al. | 260/488 CD |
| 3,721,704 | 3/1973 | Dexter | 260/45.85 P |
| 3,795,700 | 3/1974 | Song et al. | 260/45.85 R |

*Primary Examiner*—V.P. Hoke
*Attorney, Agent, or Firm*—F. W. Brunner; J. M. Wallace, Jr.

[57] ABSTRACT

This invention relates to phenolic age resisters, said age resisters being selected from the group consisting of alkylene diols and alkylene diacetates substituted with hindered phenolic groups and to their use in the stabilization of oxidizable polymers.

13 Claims, No Drawings

AGE RESISTERS FOR OXIDIZABLE POLYMERS

This invention relates to age resisters for oxidizable organic materials and their preparation and use in the stabilization of polymers which normally tend to deteriorate when exposed to normal atmospheric conditions and in particular when exposed to sunlight and/or elevated temperatures in the presence of air or oxygen.

Polymers have proven to be some of the most difficult organic materials to successfully stabilize against the deleterious effects of oxygen, particularly rubbery polymers, both natural and synthetic. Both vulcanized and unvulcanized polymers are susceptible to the deleterious effects that are found in normal atmospheric conditions, and although many materials have been suggested and used as polymer stabilizers no completely satisfactory material has been found that will fully protect these polymers under the widely different conditions to which they are subjected. The search for new and better polymer stabilizers is therefore a problem which continues to command the attention of many skilled investigators.

Phenolic materials have been among the more commonly used compounds that found wide scale acceptance as polymer stabilizers. But many of the phenolic antioxidants, although reasonably effective stabilizers for organic materials, tend to impart discoloration and staining to the materials they are intended to stabilize. An additional problem is that many of the previously known phenolic stabilizers are, in varying degrees, too readily volatilized, and therefore escape from the materials which they are intended to stabilize during the rather extended service life to which such materials are subjected.

It is therefore an object of this invention to provide a new class of phenolic antioxidants which can be used as stabilizers for organic compounds and which stabilizers are relatively nondiscoloring and nonvolatile in polymers.

In accordance with the present invention it has been found that the foregoing and additional objectives can be accomplished by employing as stabilizers for polymeric materials which are subject to the deleterious effects of oxygen and sunlight, compounds which conform to the following structural formula:

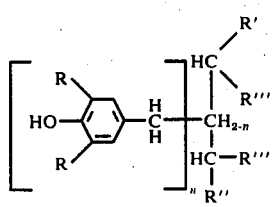

where $n$ is an integer from 1 to 2, R is selected from the group consisting of tertiary alkyl radicals having from 4 to 8 carbon atoms, R' and R'' are selected from the group consisting of hydrogen atom and methyl radical and R''' is selected from the group consisting of the radicals —OH and —OCOR'''' wherein R'''' is selected from the group consisting of alkyl radicals having from 1 to 4 carbon atoms.

Representative compounds conforming to the above structural formula include:

2-(3,5-ditertiarybutyl-4-hydroxybenzyl)-1,3-propanediol
2,2-bis(3,5-ditertiarybutyl-4-hydroxybenzyl)-1,3-propanediol
2-(3,5-ditertiarybutyl-4-hydroxybenzyl)-1,3-butanediol
2,2-bis(3,5-ditertiarybutyl-4-hydroxybenzyl)-1,3-butanediol
3-(3,5-ditertiarybutyl-4-hydroxybenzyl)-2,4-pentanediol
3,3-bis(3,5-ditertiarybutyl-4-hydroxybenzyl)-2,4-pentanediol
2-(3,5-ditertiarybutyl-4-hydroxybenzyl)-1,3-trimethylene diacetate
2,2-bis(ditertiarybutyl-4-hydroxybenzyl)-1,3-trimethylene diacetate
2-(3,5-ditertiarybutyl-4-hydroxybenzyl)-1-methyl-1,3-trimethylene diacetate
2,2-bis(3,5-ditertiarybutyl-4-hydroxybenzyl)-1-methyl-1,3-trimethylene diacetate
2-(3,5-ditertiarybutyl-4-hydroxybenzyl)-1,3-dimethyl-1,3-trimethylene diacetate
2,2-bis(3,5-ditertiarybutyl-4-hydroxybenzyl)-1,3-dimethyl-1,3-trimethylene diacetate The compounds of this invention in which R''' is the OH radical may be prepared by reduction of the corresponding carbonyl compounds with lithium aluminum hydride. The reduction may be carried out by adding a solution of the carbonyl compound to a solution or a suspension of the hydride using solvents such as tetrahydrofuran or diethyl ether. The reduction may be carried out at a temperature between room temperature and the boiling point of the solvent.

The compounds of this invention in which R''' is the OCOCH$_3$ radical may be prepared from compounds in which R''' is the OH radical by acylation with a carboxylic acid chloride or anhydride. The reaction is carried out in the presence of an acid acceptor such as triethylamine or pyridine which may also serve as the solvent. Other solvents which are suitable for this reaction are ethers such as tetrahydrofuran or diethyl ether and chlorinated hydrocarbons such as trichloroethylene or carbon tetrachloride. This reaction may also be carried out at a temperature between room temperature and the boiling point of the solvent.

The following specific examples demonstrate the preparation of compounds conforming to the present invention but are not to be interpreted as limiting the scope thereof.

EXAMPLE 1

2-(3,5-ditertiarybutyl-4-hydroxybenzyl)-1,3-propanediol was prepared by the dropwise addition of a solution of 75.6 grams of ethyl 2-(3,5-ditertiarybutyl-4-hydroxybenzyl) malonate in 300 milliliters of tetrahydrofuran to a suspension of 15.2 grams of lithium aluminum hydride in 500 milliliters of tetrahydrofuran. The addition was carried out over a period of one hour at a temperature which ranged from 36° to 46° C. The mixture was stirred for about five hours and 29 milliliters of water was then added dropwise to the mixture. After two additional hours of stirring the mixture was filtered. The filtrate was allowed to evaporate and the residual oil was triturated with hexane until crystallization occurred. The crystalline solid was filtered off and washed with boiling hexane. There was obtained 43.9 grams of product which had a melting point of 97° to 101.5° C.

EXAMPLE 2

Reduction of 45.0 grams of diethyl 2,2-bis(3,5-ditertiarybutyl-4-hydroxybenzyl) malonate with 6.4 grams of lithium aluminum hydride according to the procedure of Example 1 yielded 24.0 grams of 2,2-bis(3,5-ditertiarybutyl-4-hydroxybenzyl)-1,3-propanediol. The melting point of this compound was 185° to 187° C.

EXAMPLE 3

Using the procedure of Example 1, 40.5 grams of ethyl 2-(3,5-ditertiarybutyl-4-hydroxybenzyl) acetoacetate was reduced with 11.4 grams of lithium aluminum hydride yielding 10.7 grams of 2-(3,5-ditertiarybutyl-4-hydroxbenzyl)-1,3 butanediol. This product, after recrystallization from hexane, melted at 104° to 107° C.

EXAMPLE 4

The reaction of 45 grams of ethyl 2,2-bis(3,5-ditertiarybutyl-4-hydroxybenzyl) acetoacetate with 5.7 grams of lithium aluminum hydride using the procedure described in Example 1 yielded 24.0 grams of 2,2-bis(3,5-ditertiarybutyl-4-hydroxybenzyl)-1,3-butanediol which melted at 145° to 150° C.

EXAMPLE 5

Using the procedure of Example 1, 119 grams of 3-(3,5-ditertiarybutyl-4-hydroxybenzyl)-2,4-pentanedione was reduced with 28.2 grams of lithium aluminum hydride. There was obtained 40 grams of 3-(3,5-ditertiarybutyl-4-hydroxybenzyl)-2,4-pentanediol which melted at 102° to 105° C.

EXAMPLE 6

The reduction of 40.4 grams of 3,3-bis(3,5-ditertiarybutyl-4-hydroxybenzyl)-2,4-pentanedione with 4.35 grams of lithium aluminum hydride according to the procedure of Example 1 yielded 20.2 grams of 3,3-bis(3,5-ditertiarybutyl-4-hydroxybenzyl)-2,4-pentanediol. The melting point of the product was 160° to 169° C.

EXAMPLE 7

2-(3,5-ditertiarybutyl-4-hydroxybenzyl)-1,3-trimethylene diacetate was prepared by dropwise addition of 16.8 grams of acetic anhydride to a solution of 22.2 grams of 2-(3,5-ditertiarybutyl-4-hydroxybenzyl)-1,3-propanediol in 100 milliliters of pyridine. The addition was completed in 35 minutes and the temperature during the addition ranged from 25° to 35° C. The reaction mixture was stirred for 2-½ hours and was then poured into water. The yellow oil which precipitated crystallized on continued stirring and the crystalline solid was filtered off and allowed to dry. The crude product was recrystallized from hexane yielding 22.0 grams of product with melting point of 75° to 76.5° C.

EXAMPLE 8

A mixture of 24.0 grams of 2,2-bis(3,5-ditertiarybutyl-4-hydroxybenzyl)-1,3-propanediol and 10.5 grams of acetic anhydride dissolved in 100 milliliters of pyridine was heated at 50° C. for 6 hours. An additional 5.3 grams of acetic anhydride was added and the mixture was heated for another 7 hours. The reaction mixture was then poured into water and the solid which precipitated was filtered off and allowed to dry. There was obtained 30.0 grams of 2,2-bis(3,5-ditertiarybutyl-4-hydroxybenzyl)-1,3-trimethylene diacetate which, after recrysallization from hexane, melted at 232° to 235° C.

EXAMPLE 9

A mixture of 12.8 grams of 2-(3,5-ditertiarybutyl-4-hydroxybenzyl)-1,3-butanediol and 8.5 grams of acetic anhydride dissolved in 75 milliliters of pyridine was heated at 50° C. for 7 hours. The mixture was then poured into water and the oil which precipitated was separated by extraction with hexane. The extract was allowed to evaporate and the residue was stirred with 100 milliliters of 10 percent hydrochloric acid until crystallization occurred. The crystalline solid was filtered off and allowed to dry. The product, 2-(3,5-ditertiarybutyl-4-hydroxybenzyl)-1-methyl-1,3-trimethylene diacetate, weighed 15.0 grams and melted at 63° to 65.5° C.

EXAMPLE 10

A mixture of 12.2 grams of 2,2-bis(3,5-ditertiarybutyl-4-hydroxybenzyl)-1,3-butanediol and 7.9 grams of acetic anhydride dissolved in 75 milliliters of pyridine was stirred for 6 hours at room temperature. The reaction mixture was worked up according to the procedure described in Example 7 to yield 11.5 grams of 2,2-bis(3,5-ditertiarybutyl-4-hydroxybenzyl)-1-methyl-1,3-trimethylene diacetate which melted at 185° to 188° C.

EXAMPLE 11

Following the procedure described in Example 9, 20 grams of 3-(3,5-ditertiarybutyl-4-hydroxybenzyl)-2,4-pentanediol was reacted with 19 grams of acetic anhydride in 95 milliliters of pyridine to yield 24 grams of 2-(3,5-ditertiarybutyl-4-hydroxybenzyl)-1,3-dimethyl-1,3-trimethylene diacetate of melting point 64° to 68° C.

EXAMPLE 12

Reacting 20.2 grams of 3,3-bis(3,5-ditertiarybutyl-4-hydroxybenzyl)-2,4-pentanediol with 5.7 grams of acetic anhydride in 75 milliliters of pyridine according to the procedure described in Example 9 yielded 19.0 grams of crude 2,2-bis(3,5-ditertiarybutyl-4-hydroxybenzyl)-1,3-dimethyl-1,3-trimethylene diacetate. After washing with boiling hexane the product (9.0 grams) melted at 157° to 159° C.

The compounds of this invention are useful in protecting polymer in any form, e.g. polymer in latex form, unvulcanized polymer and vulcanized polymer. The method of addition of the antioxidant to a polymer is not critical. They may be added to a polymer by any of the conventional means known in the art such as by direct addition to a polymer latex or solution, by milling on an open mill or by internal mixing. They are highly efficient and are capable of being employed in relatively small amounts to effectively stabilize the polymers into which they are incorporated. Normally 0.001 to 5.0 percent of the antioxidant by weight based on the weight of the polymer can be used, although the precise amount of these highly effective stabilizers which is to be employed will depend somewhat on the nature of the polymer to which the stabilizer is added and the severity of the deteriorating conditions to which the polymer is to be exposed. In unsaturated polymers such as those made from conjugated dienes, the amount of antioxidant necessary is greater than that required by a saturated polymer such as polyethylene. It has been found that an effective antioxidant amount of the disclosed stabilizers in rubbery polymers will generally range from 0.05 to 5.0 percent by weight based on the weight of the polymer although it is commonly preferred to use from 0.5 to 2.0 percent by weight based on the weight of the polymer.

The polymers that may be conveniently protected by the phenolic compounds of this invention include both vulcanized and unvulcanized oxidizable polymers such as natural rubber and those synthetic oxidizable polymers which are normally susceptible to deterioration by sunlight and atmospheric oxygen such as those prepared from conjugated dienes as well as the synthetic polymers and copolymers prepared from monoolefins. Representative examples of the synthetic polymers in which the novel phenolic compounds of this invention can be employed are polychloroprene; homopolymers and copolymers of conjugated 1,3-dienes such as isoprene and butadiene and in particular, polyisoprenes and polybutadienes having essentially all of their segmeric units combined in a cis-1,4 structure; copolymers of conjugated 1,3 dienes such as isoprene or butadiene with up to 50 percent by weight of a copolymer comprising at least one copolymerizable monomer such as styrene or acrylonitrile; butyl rubber, which is a polymerization product of a major proportion of a monoolefin and a minor proportion of a multiolefin such as butadiene or isoprene; and polymers and copolymers of monoolefins containing little or no unsaturation, such as polyethylene, polypropylene, ethylene/propylene copolymers and terpolymers of ethylene, propylene and a nonconjugated diene.

The practice of this invention is found particularly beneficial when applied to the stabilization of homopolymers of a conjugated 1,3-diene such as isoprene and butadiene, copolymers of said dienes with up to 50 percent by weight of at least one copolymerizable monomer such as styrene and acrylonitrile and homopolymers of monoolefins such as polypropylene. The practice of this invention is found most beneficial when applied to the stabilization of copolymers of butadiene and styrene.

In order to evaluate the effectiveness of the compounds of this invention as stabilizers for polymers, representative compounds of this invention were incorporated into an oxidizable polymer.

EXAMPLE 13

The ability of the materials produced in the previous examples to effectively protect polymers against oxidative degration was evaluated in SBR 1006 (a hot emulsion polymerized butadiene/styrene rubber) by measuring the oxygen adsorption of the test specimens at 100° C. (Experiments 2 through 13). For comparative purposes specimens of an unstabilized SBR 1006 (Experiment 1) and one SBR 1006 sample stabilized with a commercially available phenolic antioxidant consisting of a mixture of butylated and octylated phenols in which the major constituent is 2,4-dioctyl-6-butyl phenol were also subjected to the same test procedure (Experiment 14). The data are summarized below in Table I. The oxygen absorption tests were conducted by dissolving, in benzene, portions of an SBR polymer (1106) contaning one part of the antioxidant material being tested per 100 parts of rubbery polymer. The cements so formed were poured onto aluminum foil so as to form a thin film. After drying, the weight of rubber was obtained in connection with each sample. Thereafter the foil with the adhering rubber strip was placed in the oxygen absorption apparatus. The time required for each sample to absorb 1.0 percent oxygen was determined and recorded in the following table. This testing procedure is described in further detail in Industrial & Engineering Chemistry, 43, p. 456 (1951) and Industrial & Engineering Chemistry, 45, p. 392 (1953).

TABLE I

| Experiment | Antioxidant | Oxygen Absorption, Hrs. to 1% $O_2$ |
|---|---|---|
| 1 | None | 8 |
| 2 | From Example 1 | 526 |
| 3 | From Example 2 | 475 |
| 4 | From Example 3 | 523 |
| 5 | From Example 4 | 428 |
| 6 | From Example 5 | 462 |
| 7 | From Example 6 | 462 |
| 8 | From Example 7 | 440 |
| 9 | From Example 8 | 174 |
| 10 | From Example 9 | 440 |
| 11 | From Example 10 | 387 |
| 12 | From Example 11 | 414 |
| 13 | From Example 12 | 353 |
| 14 | Mixture of butylated and octylated phenols | 325[a] |

[a]An average value derived from three separated runs.

EXAMPLE 14

The following example is illustrative of the practice of the present invention in polypropylene but is not intended to so limit the invention.

Three compounds of the present invention were dispersed in polypropylene powder ("Profax 6501" available from Hercules Inc.) using a blender and dumbbell shaped test pieces were formed from the blends by injection molding. The molded test pieces, which meet the ASTM D 638-64T, Type III specification, were aged in a circulating air oven at a temperature of 140° C. Periodical visual observations were made of the samples to determine the time required for surface crazing to develop and the time at which the samples failed due to embrittlement. The data obtained from testing samples containing 0.30 part of the compounds of this invention are summarized in Table II. Experiment 15 containing no antioxidant and Experiments 19 and 20 containing commercially available antioxidants are included for comparative purposes.

TABLE II

| Experiment | Antioxidant | Days at 140° C. to Surface Crazing | Failure |
|---|---|---|---|
| 15 | None | 1 | 3 |
| 16 | From Example 2 | 17 | 28 |
| 17 | From Example 4 | 17 | 28 |
| 18 | From Example 6 | 17 | 28 |
| 19 | 2,2'-methylenebis(4-methyl-6-tertiarybutyl) phenol | 8 | 16 |
| 20 | 2,6-ditertiarybutyl-4-methyl phenol | 2 | 3 |

EXAMPLE 15

The volatility of the compounds prepared in Examples 1, 3, 4, 5 and 6 above was compared against those of three commercially available nondiscoloring and nonstaining phenolic type antioxidants which were (A) 2,6-ditertiarybutyl-4-methyl phenol, (B) 2,2'-methylene bis (4-methyl-6-tertiarybutyl phenol) and (C) 4-hydroxymethyl-2,6-ditertiarybutyl phenol. The method employed to test the relative volatility of the compounds of this invention against the above named commercial antioxidants was the filter paper method described in Rubber Chemistry and Technology, 37 216 (1964). This test comprises dispersing approximately 0.5 gram of the antioxidant (from a benzene solution) to be tested onto 12.5 centimeter diameter, No. 1 Whatman filter paper which was previously heated to constant weight in a hot air oven at the temperature of the test (100° C.). In each test the filter paper, having the antioxidant dispersed thereon, was suspended in the center of the hot air oven. Losses were determined by periodical weighing of the filter paper. The results of these volatility tests are set forth in Table III below.

TABLE III

| Time (Min.) Sample | 5 | 10 | 15 | 30 | 60 | 120 | 180 |
|---|---|---|---|---|---|---|---|
| | | | Percent Weight Loss | | | | |
| From Ex. 1 | 5.7 | 5.9 | 10.8 | 14.3 | 18.0 | 26.0 | 35.7 |
| From Ex. 3 | 5.6 | 6.3 | 10.5 | 15.2 | 21.9 | 35.3 | 49.4 |
| From Ex. 4 | 2.5 | 3.2 | 3.4 | 4.4 | 7.0 | 7.6 | 9.2 |
| From Ex. 5 | 5.6 | 7.8 | 12.3 | 22.3 | 29.5 | 39.3 | 48.4 |
| From Ex. 6 | 3.9 | 5.3 | 5.5 | 6.4 | 9.0 | 9.4 | 10.5 |
| A | 78.6 | 96.4 | — | — | — | — | — |
| B | 14.1 | 26.5 | 39.0 | 75.4 | 96.2 | — | — |
| C | 39.5 | 63.0 | 90.2 | — | — | — | — |

As can be seen from the above table, all of the antioxidants of the present invention are considerably less volatile than the commercially available nondiscoloring and nonstaining antioxidants tested and compared therewith.

While certain representative embodiments and details have been shown for the purpose of illustrating the invention it will be apparent to those skilled in this art that various changes and modifications may be made therein without departing from the spirit or scope of the invention.

What is claimed is:

1. Compositions of matter conforming to the structural formula

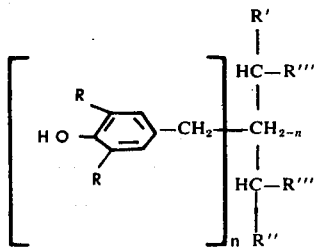

where $n$ is an integer from 1 to 2, R is selected from the group consisting of tertiary alkyl radicals having from 4 to 8 carbon atoms, R' and R'' are selected from the group consisting of hydrogen atom and methyl radical and R''' is selected from the group consisting of the radicals —OH and —OCOR'''' where R'''' is selected from the group consisting of alkyl radicals having from 1 to 4 carbon atoms.

2. Compositions according to claim 1 wherein R is tertiarybutyl radical.

3. Compositions according to claim 1 wherein R''' is the —OH radical.

4. Compositions according to claim 1 where $n$ is the integer 2.

5. Compositions according to claim 1 and corresponding to the formula therein selected from the group consisting of 2-(3,5-ditertiarybutyl-4-hydroxybenzyl)-1,3-propanediol; 2-(3,5-ditertiarybutyl-4-hydroxybenzyl)-1,3-butanediol; 3-(3,5-ditertiarybutyl-4-hydroxybenzyl)2,4-pentanediol; 2,2-bis(3,5-ditertiarybutyl-4-hydroxybenzyl)-1,3-propanediol; 2,2-bis(3,5-ditertiarybutyl-4-hydroxybenzyl)-1,3-butanediol and 3,3-bis(3,5-ditertiarybutyl-4-hydroxybenzyl)-2,4-pentanediol.

6. An oxidizable polymer selected from the group consisting of vulcanized and unvulcanized polymers selected from the group consisting of polychloroprene; homopolymers and copolymers of conjugated 1,3-dienes containing up to 50 percent by weight of at least one copolymerizable monomer; butyl rubber, polyethylene, polypropylene, ethylene/propylene copolymers and terpolymers of a nonconjugated diene and containing an antioxidant amount of an antioxidant composition conforming to the following structural formula:

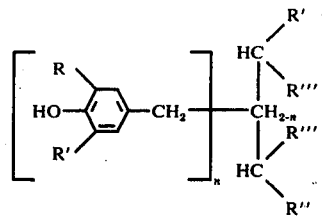

where $n$ is an integer from 1 to 2, R is selected from the group consisting of tertiary alkyl radicals having from 4 to 8 carbon atoms, R' and R'' are selected from the group consisting of hydrogen atom and methyl radical and R''' is selected from the group consisting of the radicals —Oh and —OCOR'''' where R'''' is selected from the group consisting of alkyl radicals having from 1 to 4 carbon atoms.

7. The polymer according to claim 6 wherein the homopolymers of a conjugated 1,3-diene are polyisoprene and polybutadiene, and wherein the copolymers of a conjugated 1,3-diene contain up to 50 percent by weight of the copolymer of at least one copolymerizable monomer selected from the ground consisting of styrene or acrylonitrile.

8. The polymer according to claim 6 wherein R of the antioxidant is tertiarybutyl radical.

9. The polymer according to claim 6 wherein R''' of the antioxidant is the —OH radical.

10. The polymer according to claim 6 wherein the antioxidant amount ranges from 0.001 to 5.0 percent by weight based on the weight of the polymer.

11. The polymer according to claim 6 wherein the antioxidant amount ranges from 0.05 to 5.0 percent by weight based on the weight of the polymer.

12. The polymer according to claim 6 wherein the antioxidant amount ranges from 0.5 to 2.0 percent by weight based on the weight of the polymer.

13. The polymer according to claim 6 wherein the antioxidant composition is selected from the group consisting of 2-(3,5-ditertiarybutyl-4-hydroxybenzyl)-1,3-propanediol; 2-(3,5-ditertiarybutyl-4-hydroxybenzyl)-1,3-butanediol; 3-(3,5-ditertiarybutyl-4-hydroxybenzyl)-2,4-pentanediol; 2,2-bis(3,5-ditertiarybutl-4-hydroxybenzyl)-1,3-propanediol; 2,2-bis(3,5-ditertiarybutyl-4-hydroxybenzyl)-1,3-butanediol and 3,3-ditertiarybutyl-4-hydroxybenzyl)-2,4-pentanediol.

* * * * *